(12) United States Patent
Tschech et al.

(10) Patent No.: US 7,501,004 B2
(45) Date of Patent: Mar. 10, 2009

(54) FILTER ELEMENT

(75) Inventors: Thomas Tschech, Marbach (DE); Frank Skudlarz, Osterwieck (DE); Sascha Bauer, Auenwald (DE); Klaus Arnegger, Ludwigsburg (DE); Michael Fasold, Auenwald (DE); Jochen Linhart, Waiblingen (DE); Klemens Dworatzek, Edingen (DE)

(73) Assignee: Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 11/723,703

(22) Filed: Mar. 21, 2007

(65) Prior Publication Data

US 2007/0251392 A1 Nov. 1, 2007

Related U.S. Application Data

(63) Continuation of application No. PCT/EP2005/054682, filed on Sep. 20, 2005.

(30) Foreign Application Priority Data

Sep. 21, 2004 (DE) .................. 10 2004 045 761
Mar. 8, 2005 (DE) .................. 10 2005 010 443

(51) Int. Cl.
*B01D 46/00* (2006.01)

(52) U.S. Cl. .................. 55/502; 55/385.3; 55/498; 55/503; 123/198 E

(58) Field of Classification Search .................. 55/385.3, 55/498, 502, 503, 504; 123/198 E
See application file for complete search history.

(56) References Cited

U.S. PATENT DOCUMENTS

| | | | |
|---|---|---|---|
| 6,179,890 B1* | 1/2001 | Ramos et al. .................. 55/482 |
| 6,190,432 B1* | 2/2001 | Gieseke et al. .................. 55/385.3 |
| 6,348,084 B1* | 2/2002 | Gieseke et al. .................. 95/273 |
| 6,348,085 B1 | 2/2002 | Tokar et al. |
| 6,350,291 B1* | 2/2002 | Gieseke et al. .................. 55/385.3 |
| 6,517,598 B2* | 2/2003 | Anderson et al. .................. 55/498 |
| 6,547,857 B2* | 4/2003 | Gieseke et al. .................. 95/273 |
| 6,610,117 B2* | 8/2003 | Gieseke et al. .................. 55/385.3 |
| 6,610,126 B2* | 8/2003 | Xu et al. .................. 95/273 |
| 6,673,136 B2* | 1/2004 | Gillingham et al. .................. 95/273 |
| 6,746,518 B2* | 6/2004 | Gieseke et al. .................. 95/273 |
| 6,783,565 B2* | 8/2004 | Gieseke et al. .................. 55/385.3 |
| 6,878,190 B1* | 4/2005 | Xu et al. .................. 95/273 |
| 6,966,940 B2* | 11/2005 | Krisko et al. .................. 55/497 |
| 6,974,490 B2* | 12/2005 | Gillingham et al. .................. 55/486 |
| 6,997,968 B2* | 2/2006 | Xu et al. .................. 55/495 |
| 7,001,450 B2* | 2/2006 | Gieseke et al. .................. 95/273 |
| 7,004,986 B2* | 2/2006 | Kopec et al. .................. 55/337 |
| 7,090,712 B2* | 8/2006 | Gillingham et al. .................. 55/486 |
| 7,211,124 B2* | 5/2007 | Gieseke et al. .................. 55/357 |
| 7,270,692 B2* | 9/2007 | Gillingham et al. .................. 55/486 |
| 7,303,604 B2* | 12/2007 | Gieseke et al. .................. 55/385.3 |
| 2001/0003893 A1* | 6/2001 | Ramos et al. .................. 55/482 |

* cited by examiner

*Primary Examiner*—Duane S Smith
*Assistant Examiner*—Robert A Clemente
(74) *Attorney, Agent, or Firm*—Crowell & Moring LLP

(57) ABSTRACT

A filter element comprising a filter medium which extends through an axial length between an end face at a clean air end and an end face at an unfiltered air end such that the filter medium separates an unfiltered air end of the filter element from a clean air end, in which the filter medium is circumferentially surrounded by a jacket and attached in a sealed manner to the jacket, and in which contours for securing the filter element in a filter housing are arranged on the jacket of the filter element.

12 Claims, 13 Drawing Sheets

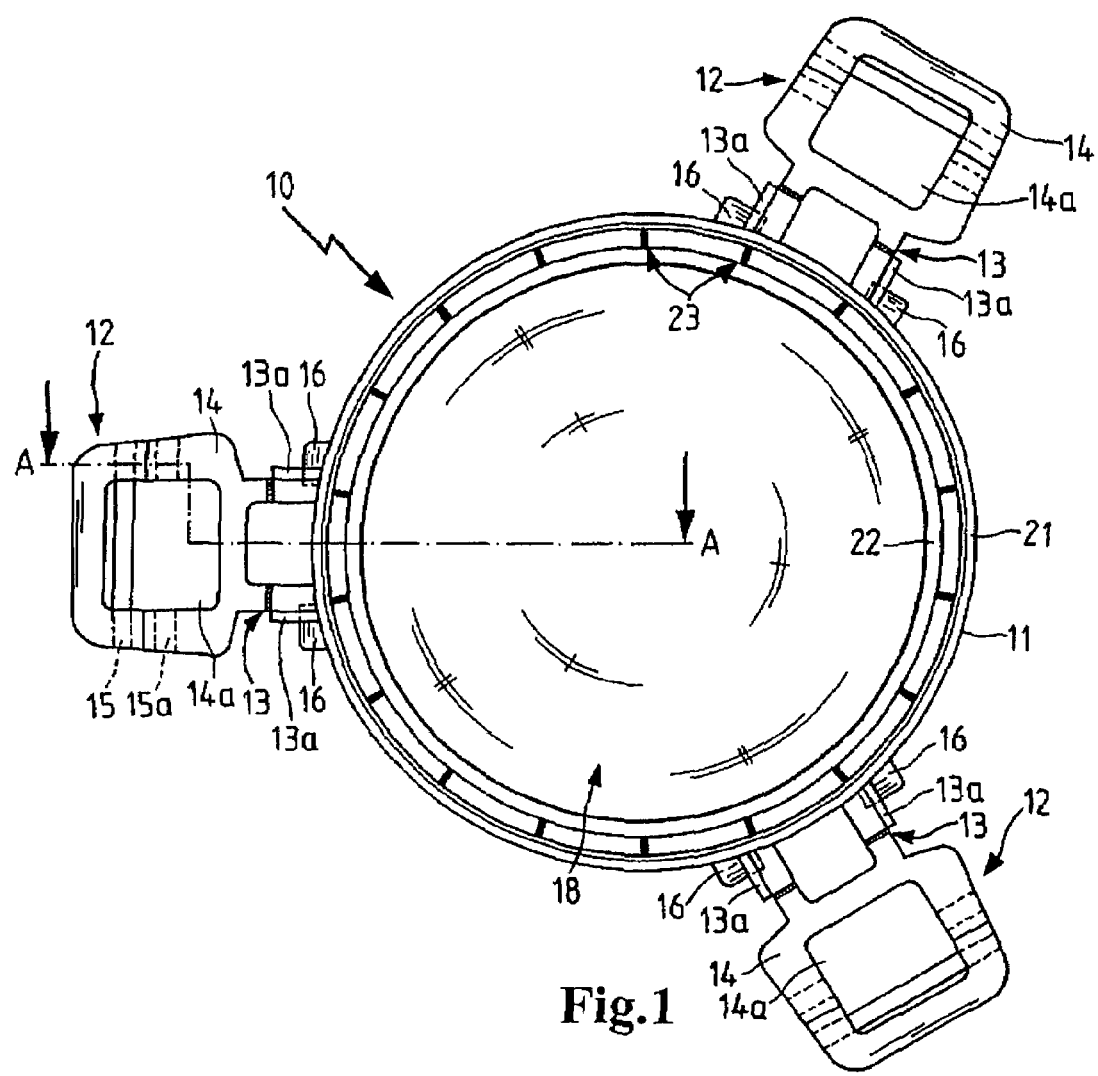
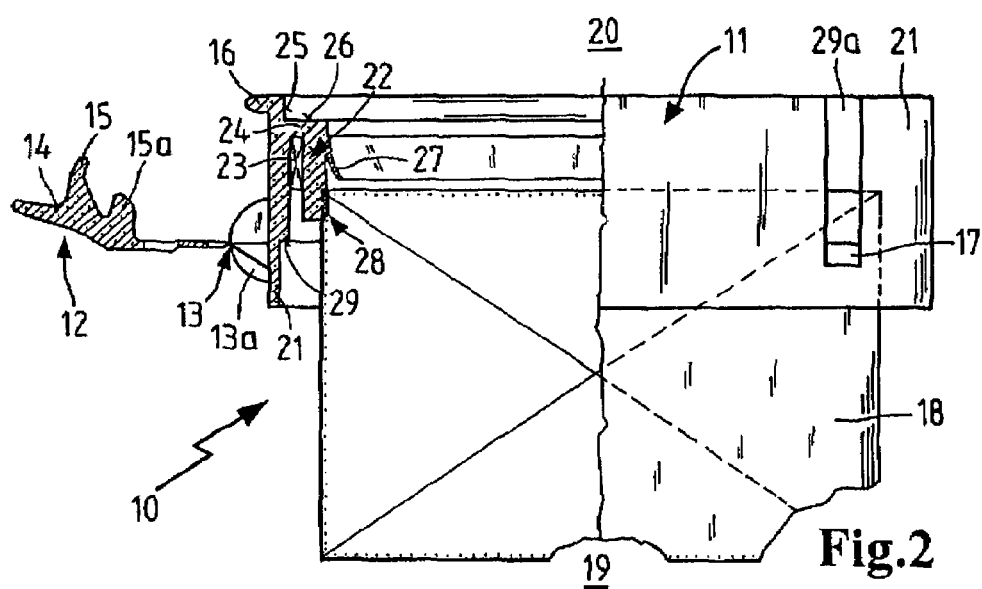

FILTER ELEMENT

CROSS REFERENCE TO RELATED APPLICATIONS

This application is a continuation of international application no PCT/EP2005/054682, filed Sep. 20, 2005, designating the United States of America and published in German on Mar. 30, 2006 as WO 2006/032656, the entire disclosure of which is incorporated herein by reference. Priority is claimed based on Federal Republic of Germany patent application nos. DE 10 2005 010 443.6, filed Mar. 8, 2005 and DE 10 2004 045 761.1, filed Sep. 21, 2004.

BACKGROUND OF THE INVENTION

This invention relates to a filter element through which the medium to be filtered flows with a surrounding jacket, to an unfiltered air element, a clean air tube and an air filter system formed therefrom, and to a method of manufacturing such a filter element and filter system.

U.S. Pat. No. 6,348,085 describes a filter element through which the medium flows axially between a clean air end on one end and an unfiltered air end on the opposite end. The filter element has a cylindrical shape and is connected on its radial circumferential surface in a sealed manner to a jacket. A disadvantage of this arrangement is that the sealing connection between the circumferential sheath and the filter must take place in the radial intermediate area. In addition, the filter element must be accommodated in a tubular filter system to ensure its function and clean air end of the filter element must be attached in a sealed manner to a flange in the direction of flow of the air stream. Due to the contours of the jacket, complex fastening means are required to ensure these functions.

SUMMARY OF THE INVENTION

It is therefore an object of the present invention to provide an improved axial flow filter element and filter system therefor.

Another object of the invention is to provide a filter element with axial flow through it for a filter system and an unfiltered air element and a clean air element for this filter system which facilitate a tight and reliable installation in the filter system.

A further object of the invention is to provide an axial flow filter element for a filter system including an unfiltered air element and a clean air element which can be manufactured in a cost effective manner.

These and other objects are achieved in accordance with the present invention by providing a filter element comprising a filter medium extending over an axial length between a clean air end at one end and an unfiltered air end at the opposite end, a circumferential jacket surrounding the filter medium with the filter medium being attached in a sealed manner to the jacket, and the filter medium separating an unfiltered air end from the clean air end, wherein contours are provided on the jacket for fastening the filter element in a filter housing.

The filter element according to the invention comprises a substantially cylindrical filter medium and extends over an axial length between a clean air end on one end and an unfiltered air end on the other end. A jacket surrounds the filter medium on at least one end. The connection between the jacket and the filter medium may be arranged on the clean air end as well as on the unfiltered air end of the filter medium.

The jacket may protrude axially beyond the filter medium in both end directions and is thus suitable for arrangement of sealing and fastening contours with respect to the clear air end and the unfiltered air end. Suitable materials which may be used for the jacket include synthetic resin materials (i.e., plastics) such as polyamide (nylon) or polypropylene and possibly even thermoplastic elastomers. The jacket is preferably manufactured by an original forming method, in particular by a plastic injection molding method. The sheath makes it possible advantageously to establish the tight connection to the filter medium and also a connection to the filter housing.

In one advantageous embodiment, the jacket is comprised of two coaxially arranged rings, which are manufactured in one piece with the jacket. Due to this arrangement, the jacket is reinforced in an advantageous manner against static and dynamic stresses. Therefore the walls may have a thin construction which results in a reduction in weight of the jacket. In addition, it is advantageous that the peripheral web may be utilized as a contact surface for a clean air tube.

In accordance with another embodiment of the invention, movable latches are arranged directly on the jacket which are provided for effecting a form-fitting detachable attachment to a flange on the clean air end. The jacket may be produced in one piece with the latches, which thus facilitates inexpensive and economical manufacture. In addition to the simple manufacturing process, there is no need for additional parts for the latches.

In accordance with another advantageous embodiment of the invention, an elastic sealing contour is produced in one piece with the jacket in the clean air area of the jacket. This part can be demolded axially, so that in removing the part from the mold, no burr is formed on the sealing surface. The elastic sealing contour preferably comprises a thin-walled web which is constructed at an acute angle to the longitudinal axis of the jacket. The sealing contour serves to establish a sealing connection to a flange on the clean air end. To prevent relative movements in the sealing area, the flange at the clean air end is supported against the jacket outside of the sealing contour. The arrangement of the elastic sealing contour in the jacket makes it possible to eliminate the use of additional elastomer seals.

In another advantageous embodiment, the jacket is attached to the filter housing in a form-fitting manner by a connecting latch. To do so, recesses may be provided on the jacket or on the filter housing which correspond to and are engaged by latch members on the filter housing or on the jacket.

The jacket according to the invention may advantageously be used for a wound filter as well as for an extruded filter medium. The wound filter which is comprised of pleated filter layers rolled up to form channels which are sealed at alternate ends does not require end disks on its ends. An extruded filter element is comprised of a medium foamed by a propellant gas. Alternatively, round filter element folded to a pleated hollow cylinder may be used.

In another embodiment, the filter medium is fused with the jacket in a connecting area, so that a simple, reliable, inexpensive and advantageous connection between the filter medium and jacket can be established.

In conjunction with the proposed filter element, an unfiltered air element is described. The unfiltered air element comprises an unfiltered air tube which draws in unfiltered air through an intake funnel and in which the intake gas stream is guided in the direction of flow through a transitional area into a filter housing. The filter housing extends axially across a housing interior space and has a communicating section on its outer lateral surface that is provided for connecting to a jacket. The filter housing may, for example, have an oval or round construction, and resonator chambers for acoustic damping of the intake noise optionally may also be provided on the filter housing. The unfiltered air element is manufactured as a one-piece component and forms the unfiltered air tube while at the same time forming a housing for accommodating a filter medium.

In one advantageous embodiment of the unfiltered air element, latch members are provided in the area of the communicating section. The latch members can engage in recesses in the jacket to secure the unfiltered air element to the jacket. This latching connection makes it possible to establish an inexpensive, reliable and form-fitting attachment between the filter housing and the jacket.

In one advantageous embodiment of the invention, the unfiltered air tube includes a flexible tube section. The flexibility is achieved by radially pleated flanks which extend in a zigzag pattern along the direction of flow. Each pair of folds creates a locking longitudinal or angular adjustment. For each pair of folds, the flexible section can usually be bent through an angle range of 5° to 20°. This type of flexible tube section has previously been known for use in drinking straws or medical supply tubing. The locking of the flexible section, which is flexible in both angle and length, makes it possible to manufacture the flexible length of tubing in a straight configuration and subsequently adapt the tubing at the time of installation to the configuration of the space in which it is installed.

To stabilize the flexible tube sections, catch elements may be mounted on the opposite fold flanks, locking in one another when pushed together and assuming a locked connection due to engagement in an undercut. Individual or multiple catch elements may be mounted on the individual fold flanks so that multiple catch options are obtained. Arrangement of additional catch elements in the area of a flexible section yields the advantage that the flexible tube section is bent into position, the tube section is rigid and has an increased resistance to vibration and bending loads.

In accordance with another advantageous embodiment of the unfiltered air element, perforations in the form of axially extending slots or holes are provided in the area between the intake funnel and the curved section. The arrangement of perforations in the unfiltered air tube advantageously dampens the noise level which arises due to air pulsation in the tube.

Another advantageous addition to the filter element is a clean air tube which has a cylindrical outside surface at its inlet end, which cylindrical outside surface communicates with a sealing contour of a jacket. The clean air tube tapers in a reducing section to a cross section to which a flexible section is attached. The flexible section serves to compensate for tolerances or adapt to the installation situation. The structure of the flexible section corresponds to that of the flexible section of the previously described unfiltered air tube.

The clean air tube according to the invention is advantageously manufactured as a one-piece component. The arrangement of the sealing surface as a cylindrical outside surface makes it possible to determine the sealing contour accurately through the mold shape and thus ensure a high reliability of the sealing surface.

In another advantageous embodiment of the invention, the bulge in the clean air tube on the clean air end communicates with a supporting contour on the jacket. Therefore, there is axial and radial support, thus ensuring a high reliability of the seal between the flange on the clean air end and the jacket.

Another advantageous embodiment of the clean air tube is made possible due to the arrangement of a connecting collar adjacent the end face of the discharge end of the clean air tube. This connecting collar is formed in one piece and annularly integrated into the wall of the reduced clean air tube. The connecting collar serves to connect the clean air tube to a more extensive air tube, a flange or a suction tube. For this purpose, the connecting collar can, for example, be glued, welded, screwed or even clamped onto a ring which communicates with the connecting collar. The arrangement of the connecting collar ensures the connection to a more extensive air tube in an advantageous manner. The required assembly effort is made easier in any event by the connecting collar.

An air filter system according to the invention is results from a combination of one or more features of the filter element, unfiltered air element and/or clean air tube described above. The jacket here serves as a central function carrier which ensures a secure attachment to the unfiltered air element and tight connection to the clean air tube.

The air filter system according to the invention makes it possible to form the system from a filter element, a clean air tube and an unfiltered air element, whereby the components can be produced by various manufacturing methods. Due to the transfer of important functions to a central component, the entire filter system can be manufactured advantageously. The individual elements of the filter system may, of course, be adapted to various installation systems with similarly configured receiving contours, thus making it possible to design a modular system for various applications.

Another part of the invention relates to a manufacturing method for a clean air tube and an unfiltered air element of the filter system described above. The clean air tube and the unfiltered air element may be manufactured in one piece in a single operation as a preform in a die-casting mold by the blow molding method. The blow molding method requires an approximately linear tube cross section between the ends of the tube to be manufactured. To linearly bridge a possible angular offset between the parting surfaces, a connecting section severable from the preform may be arranged between the parting surfaces. Production can also be carried out by an extrusion blow molding method.

This manufacturing method makes it possible in an advantageous manner to manufacture both the clean air tube and the unfiltered air element in a single operation, so that the cycle time of the blow molding system can be reduced.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures, in which:

FIG. 1 is a view of the filter element of the invention as seen from the end face of the unfiltered air end;

FIG. 2 is a partially sectional side view of a filter element according to the invention;

DETAILED DESCRIPTION OF PREFERRED EMBODIMENTS

Figure 3:
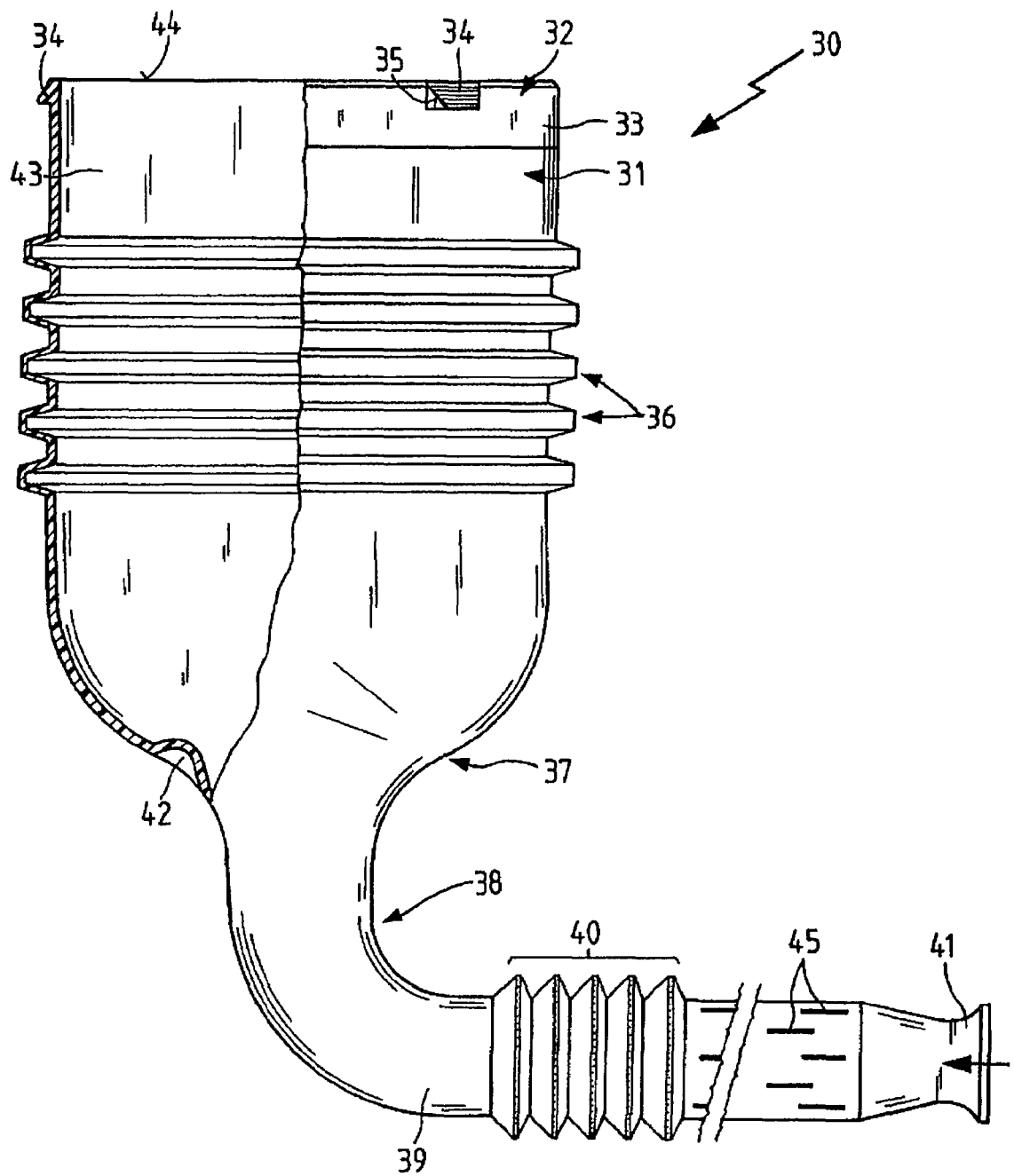
FIG. 3 is a partially sectional side view of an unfiltered air element according to the invention.

The cylindrical filter element 10 shown in FIG. 1 comprises a filter medium 18 surrounded on one end by a jacket 11. The jacket 11 comprises an inner ring 22 and coaxially with that an outer ring 21. Inner ring 22 and outer ring 21 are reinforced with respect to one another by intervening ribs 23. On the outer circumferential surface of the jacket 11, pivotable catches 14, which serve as movable latches 12, are movably connected by film hinges 13 to axial webs 13a and through these webs to the jacket 11. Adjacent the catches 14, two cams 16 protrude radially outwardly from the outer ring 21. In the position shown here, the catches 14 are oriented approximately 90° to the axis of flow of the filter element 10. The window-shaped recesses 14a in the catches 14 serve to provide manual locking and to save on material. Claws 15, 15a directed toward one another are represented as concealed edges on the catches 14.

FIG. 2 shows a partially sectional side view of the filter element 10 according to FIG. 1. Parts corresponding to those in FIG. 1 are identified by the same reference numerals. The filter medium 18 is arranged at the unfiltered air end 19 and the jacket 11 is arranged at the clean air end 20. The filter medium 18 is fused to the inner ring 22 of the jacket 11 in the area of a fusing zone 28 and is thereby connected in a sealed manner to the jacket 11. The entire jacket 11 is constructed in one piece, with the inner ring 22 connected to the outer ring 21 by a circumferential web 24. Axially extending ribs 23 are arranged between the inner ring 22 and the outer ring 21.

Between the filter medium 18 and the outer ring 21 there is a radial space in which a communicating section 32 of an unfiltered air element 30 as shown in FIG. 3 is received. A rectangular recess 17 on the outer ring 21 serves to secure a locking connection with a detent nose 34 shown in FIG. 3. On the clean air end of the jacket 11, the cam 16 does not extend around the entire circumference, but instead merely over the respective circumferential segments on which there is a catch 14.

On the outer ring 21 on the side end facing the filter medium 18, a shoulder 29 of the outer ring 21 is formed to the side of the filter medium 18, at which the wall thickness of the outer ring 21 is reduced. On the outer side of the outer ring 21, an axial groove 29a is formed in those circumferential areas in which the recesses 17 are arranged. This axial groove 29a has a radial depth that is equal to the wall thickness of the shoulder 29 of the outer ring 21. Since the entire jacket 11 is manufactured by the injection molding method and is demolded axially, the recess 17 may be formed by the fact that the axial groove 29a extends in the axial direction to beyond the shoulder 29 on the outer ring 21. The recesses 17 are arranged on the circumference in the areas where there is no catch 14 and therefore there is no cam 16 on the jacket 11. The ability to produce the contour of the mold which forms the axial groove 29a is thus ensured, and the recess 17 can be formed in the mold without any additional lateral slides. The inner ring 22 and the outer ring 21 are joined by the circumferential web 24 and are reinforced with respect to one another by the ribs 23.

An elastic sealing contour 27 in the form of a circumferential sealing lip, which protrudes into the inside of the flow cross section, is integrally molded on the inner ring 22. When the filter system is assembled, the elastic sealing contour 27 is in contact with a cylindrical outside surface 62 shown in FIG. 4. The elastic sealing contour 27 may have a rectangular, curved or conical cross section. To ensure the elasticity, the elastic sealing contour 27 is preferably maximally 0.5 mm thick.

Figure 4:
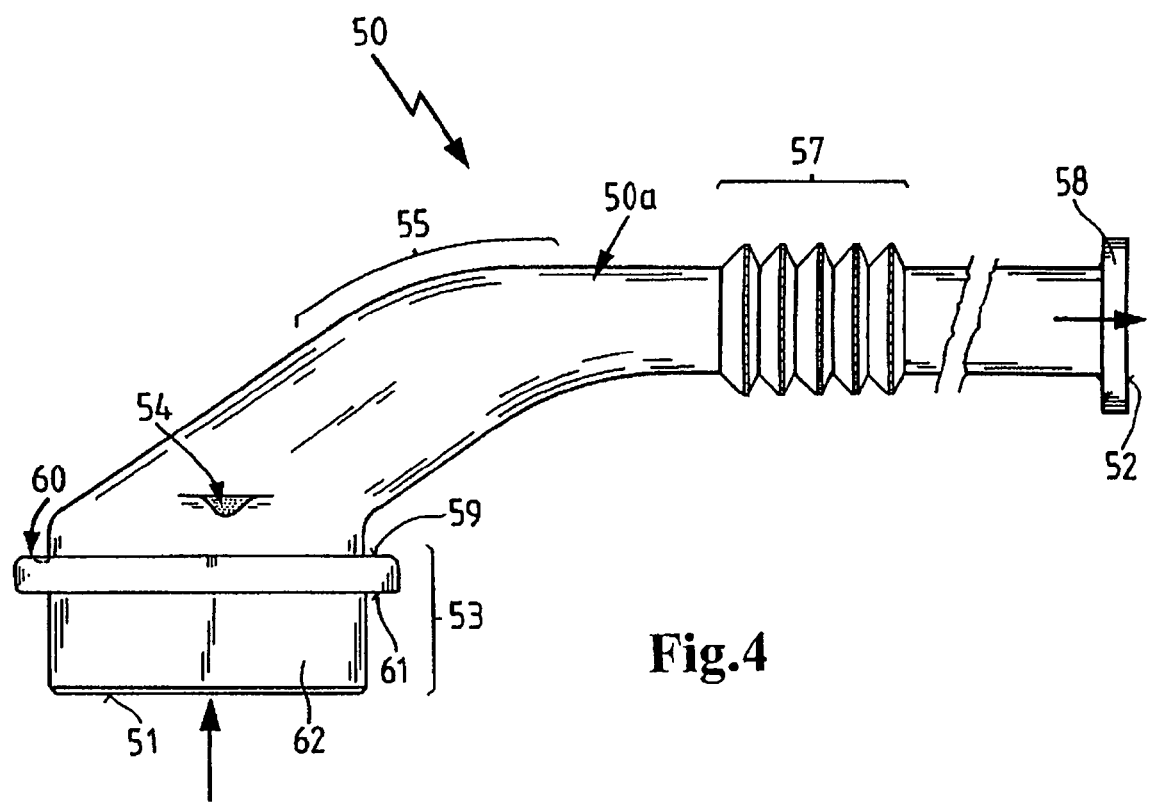
FIG. 4 is a side view of a clean air tube according to the invention.

On the outer circumference of the outer ring 21, the movable catches 14 are disposed on the axial webs 13a via film hinges 13. Claws 15, 15a which serve to attach a clean air tube 50 shown in FIG. 4 are arranged on the catch 14.

FIG. 3 shows the unfiltered air element 30 which comprises a filter housing 31 surrounding a housing interior space 43. Components that correspond to those illustrated in the previous figures are identified by the same reference numerals. The open end face 44 serves to introduce the filter element 18 shown in FIG. 1. In a transitional area 37, the cross section of the filter housing 31 tapers to a cross section of an unfiltered air tube 39. Between the transitional area 37 and the unfiltered air tube 39, the air stream is deflected by a curved section 38. In addition, a flexible tube section 40 and an intake funnel 41 are arranged on the unfiltered air tube 39. The slots 45 serve to provide acoustic damping and are arranged so they are directly adjacent to the intake funnel 41.

On the side of the filter housing 31 shown in the sectional view, a receiving trough 42 is visible. The receiving trough 42 communicates with receiving elements (not shown) of a fastening structure in the installed state. The radial ribs and grooves 36 surrounding the filter housing 31 are responsible for a radial stabilization and also provide a measure of axial flexibility to the filter housing 31. Due to this axial flexibility, it is also possible to allow an axial tension force between the receiving troughs 42 and a communicating section 32.

The communicating section 32 comprises a connecting surface 33 and fastening noses 34, on which angled unlocking surfaces 35 are provided. The communicating section 32 thus serves to secure the unfiltered air tube 30 to the filter element 10 shown in FIGS. 1 and 2.

The clean air tube 50 shown in FIG. 4 comprises a flange 53 on the clean air end that serves to provide a tight connection to a filter element 10 shown in FIGS. 1 and 2. Components corresponding to those depicted in the previous figures are identified by the same reference numerals. In a reduction section 55, the cross section of the inlet end 51 is reduced to the cross section of a reduced clean air tube 50a. In addition, a flexible section 57 and a connecting collar 58 are provided on the reduced clean air tube 50a. The flexible section 57 has radial and axial flexibility. Within a defined angular range and a defined length range it is possible to lock the flexible section 57 in position via catches.

The connecting collar 58 serves to provide a sealing connection, for example, to an air tube (not shown) or to a throttle valve (not shown). In the illustrative embodiment shown here, the connecting collar 58 is arranged at the end face of the discharge end 52 of the clean air tube.

Figure 5:
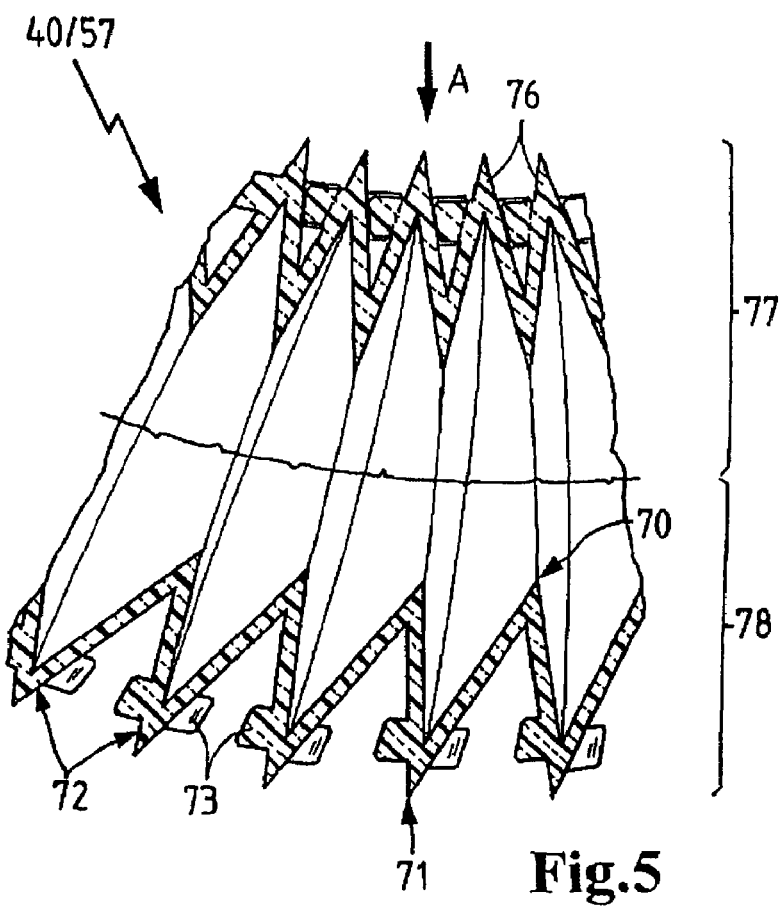
FIG. 5 is a detail sectional view of a flexible tube section.

FIG. 5 shows full sectional view of a detail of a flexible tube section 40, 57. Components corresponding to those depicted in previous figures are identified by the same reference numerals. In addition, the flexible tube section 40, 57 is reinforced with catch pairs 73. The flexible tube section 40 is shown bent here, with one side of the tube section 40 depicted with the catch pairs in the engaged position 77 and the opposite side being depicted with the catch pairs in the disengaged position 78. The individual folds 76 are formed from two fold flanks 72, with the fold flanks 72 having a closer spacing in the engaged position than with the catch pairs in the disengaged position 78. For latching connection, catch pairs 73 are provided on the fold flanks 72, engaging with one another in a latched position 77 and being spaced apart from one another in an unlatched position 78. The individual fold flanks 72 are arranged at different angles to the axis of flow and thus have different fold lengths, extending from the outer fold tip 71 to the inner fold tip 70.

Figure 6:
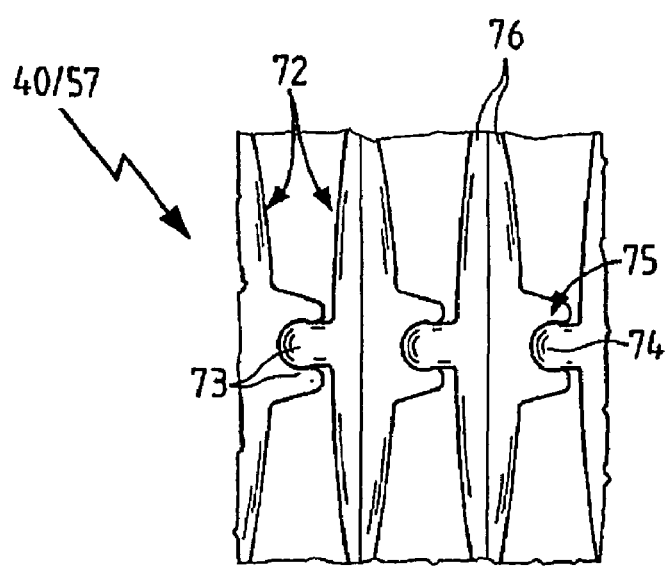
FIG. 6 is a top view of the flexible tube section of FIG. 5A.

FIG. 6 is a top view of the flexible tube section 40, 57 according to FIG. 5 as viewed in the direction of arrow A. Components corresponding to those depicted in the previous figures are again identified by the same reference numerals. A catch finger 74 is provided on the individual fold flanks 72 of one fold and a catch socket profile 75 is provided on the opposite fold flank. The catch fingers 74 have a spherical contour which locks in a communicating circular contour of the catch socket profile 75. The catch fingers 74 and socket profile 75 thus form a catch pair. If desired, the geometry of the catch contours may also be angular instead of circular. For example, the contours alternatively may be constructed like the contours of a grooved closure known from locking bags. The longitudinal extension catch profiles are directed toward the center of the flow cross section so that the ability to demold the molded parts from the mold is ensured.

Figure 7:
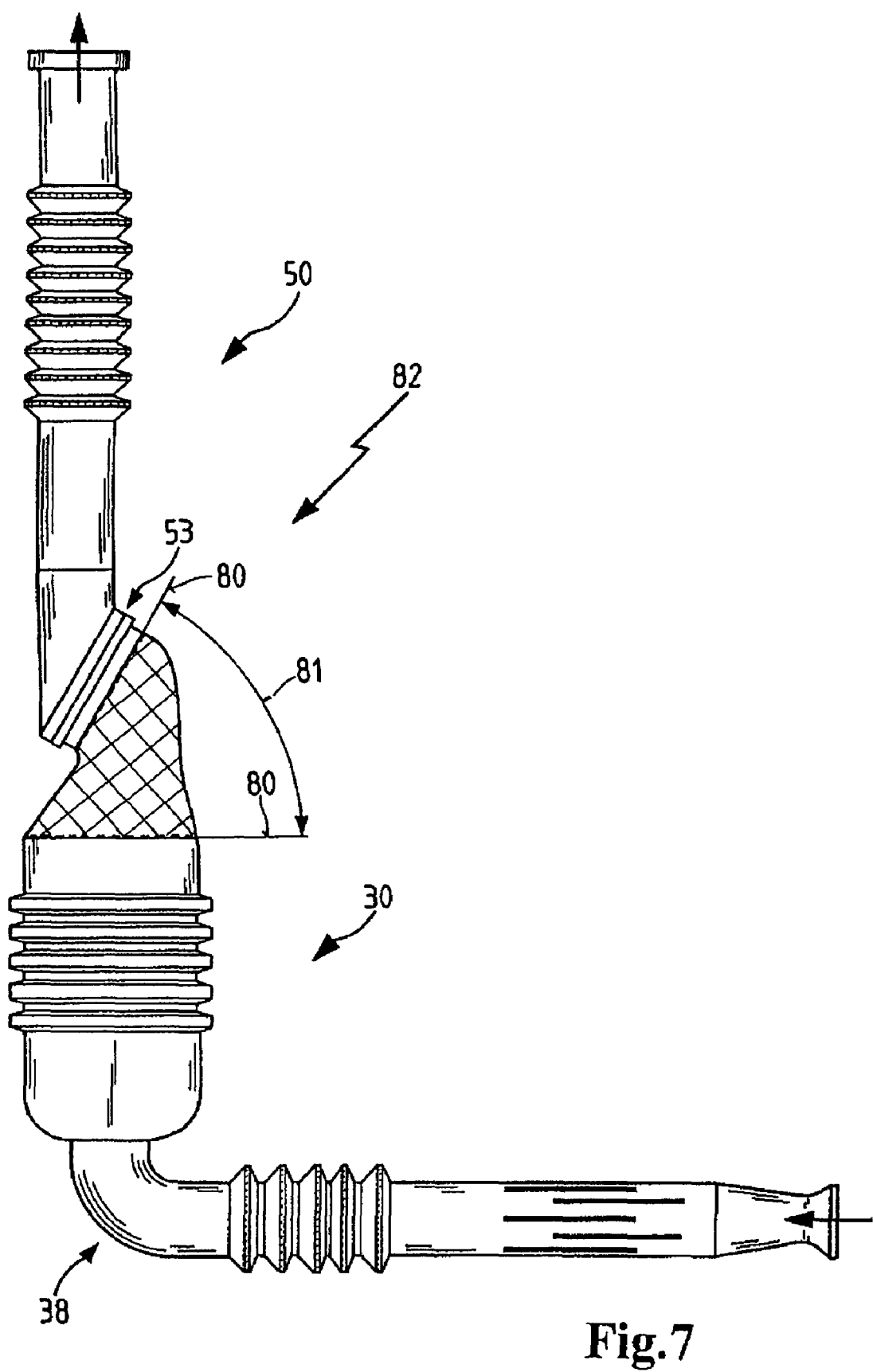
FIG. 7 is a side elevational view of a clean air tube and an unfiltered air element made from a one piece preform.

FIG. 7 shows a preform 82 of a clean air tube 50 and an unfiltered air element 30. This can be manufactured in a single operation in one mold and includes the unfiltered air element 30 and the clean air tube 50. Components corresponding to those depicted in the previous figures are again identified by the same reference numerals. To achieve the most linear possible mold shape, a connection section 81 is arranged between the angled flange 53 on the clean air end and the connection to the unfiltered air element 30. Connection section 81 is severed from the preform blank 82 at the parting surfaces 80 after the blow molding operation. This yields the individual components such as the clean air tube 50 and the unfiltered air element 30. The curved section 38 of the unfiltered air element 30 may be formed by a pivotable mold, for example, which is pivoted into the angular position between the introduction of the preform and the blow molding operation itself.

Figure 8:
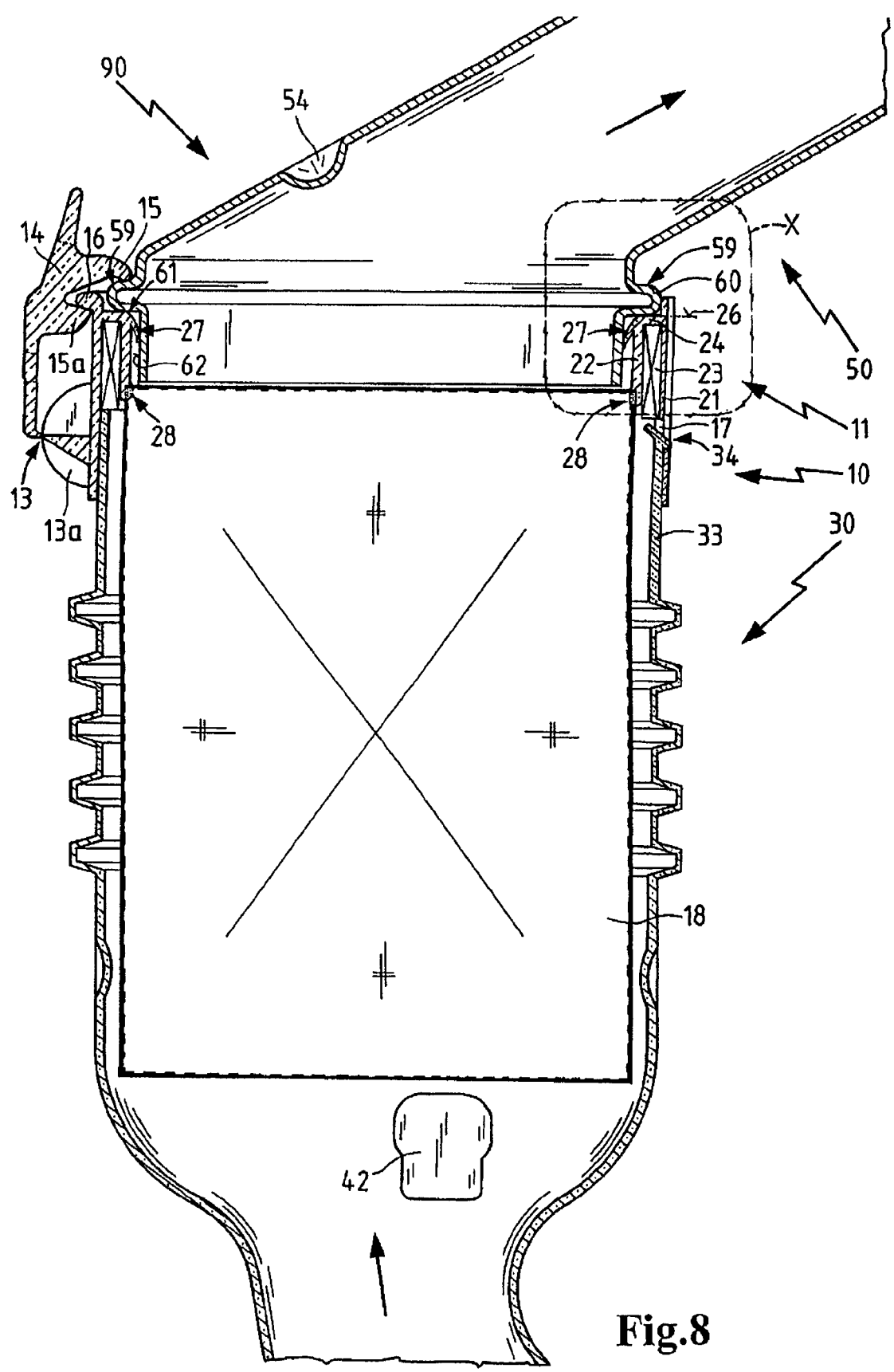
FIG. 8 is a sectional view of an assembled air filter system according to the invention.
Figure 8A:
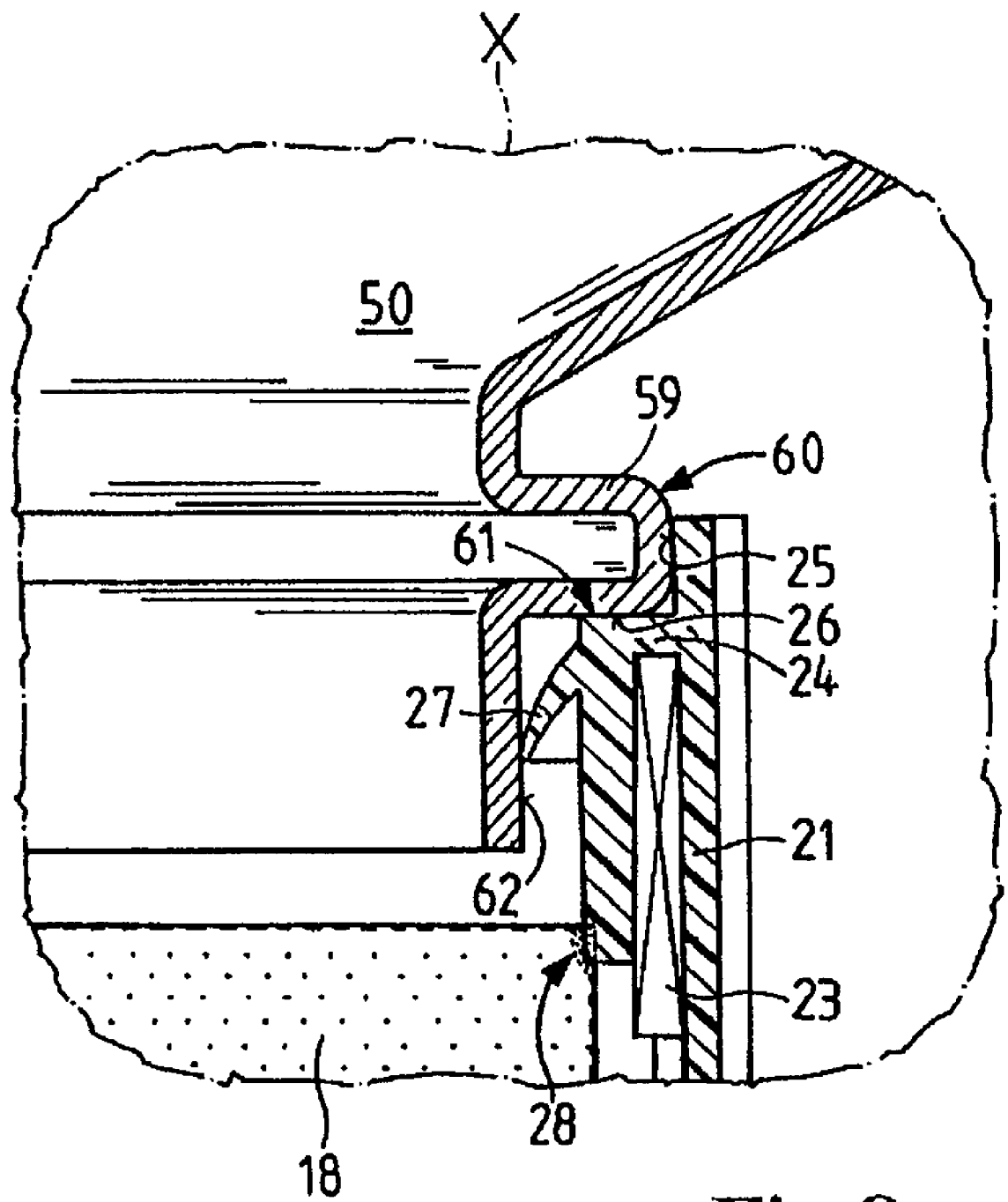
FIG. 8a is an enlarged detail X of FIG. 8.

FIGS. 8 and 8a show an assembled air filter system 90, comprising the filter element 10, the clean air tube 50, a detail of which is shown, and the unfiltered air element 30, a detail of which is shown, both in full sectional view. The detail X of FIG. 8 is shown on an enlarged scale in FIG. 8a. Components corresponding to those in the preceding figures are labeled with the same reference numerals. The jacket 11 serves as a central carrier to which the clean air tube 50, the unfiltered air element 30 and the filter medium 18 are attached. The jacket 11 is formed in this case from the outer ring 21 and the coaxial inner ring 22. The outer ring and the inner ring are joined together in a sealed manner by the circumferential web 24 and are reinforced by the ribs 23. A fusing zone 28 is provided on the inner ring 22, and an end edge of the filter medium 18 is fused into this zone.

To attach the clean air tube 50, a pivotable catch 14 that is attached by a film hinge 13 is arranged on the jacket 11. The claws 15, 15a which extend over the annular shoulder 59 of the bulge 60 on the clean air end and the cam 16 on the jacket 11 are provided on the strap 14 so that they are clamped against one another. The annular supporting surface 61 of the clean air tube 50 is seated axially against the supporting contour 26 of the jacket 11 and the bulge 60 on the clean air end is seated against the radial supporting section 25. The elastic sealing contour 27 is situated around the cylindrical outside surface 62 of the jacket 11, thereby forming a tight connection between the clean air tube 50 and the filter element 10.

The unfiltered air element 30 is attached to the opposite, lower end of the jacket 11. For this purpose the unfiltered air element has a cylindrical connecting surface 33 which is inserted through an axial length inside the outer ring 21 of the jacket 11. For secure attachment, detent noses 34 are provided on the unfiltered air element 30, which form a catch connection with recesses 17 provided on the outer ring 21. A receiving groove 42 is suitable for receiving the unfiltered air element 30 on a corresponding mounting structure (not shown). In conjunction with the clamping recess 54, the entire air filter system 90 may be simultaneously clamped together and mounted, e.g., by a tension strap (not shown).

Figure 9:
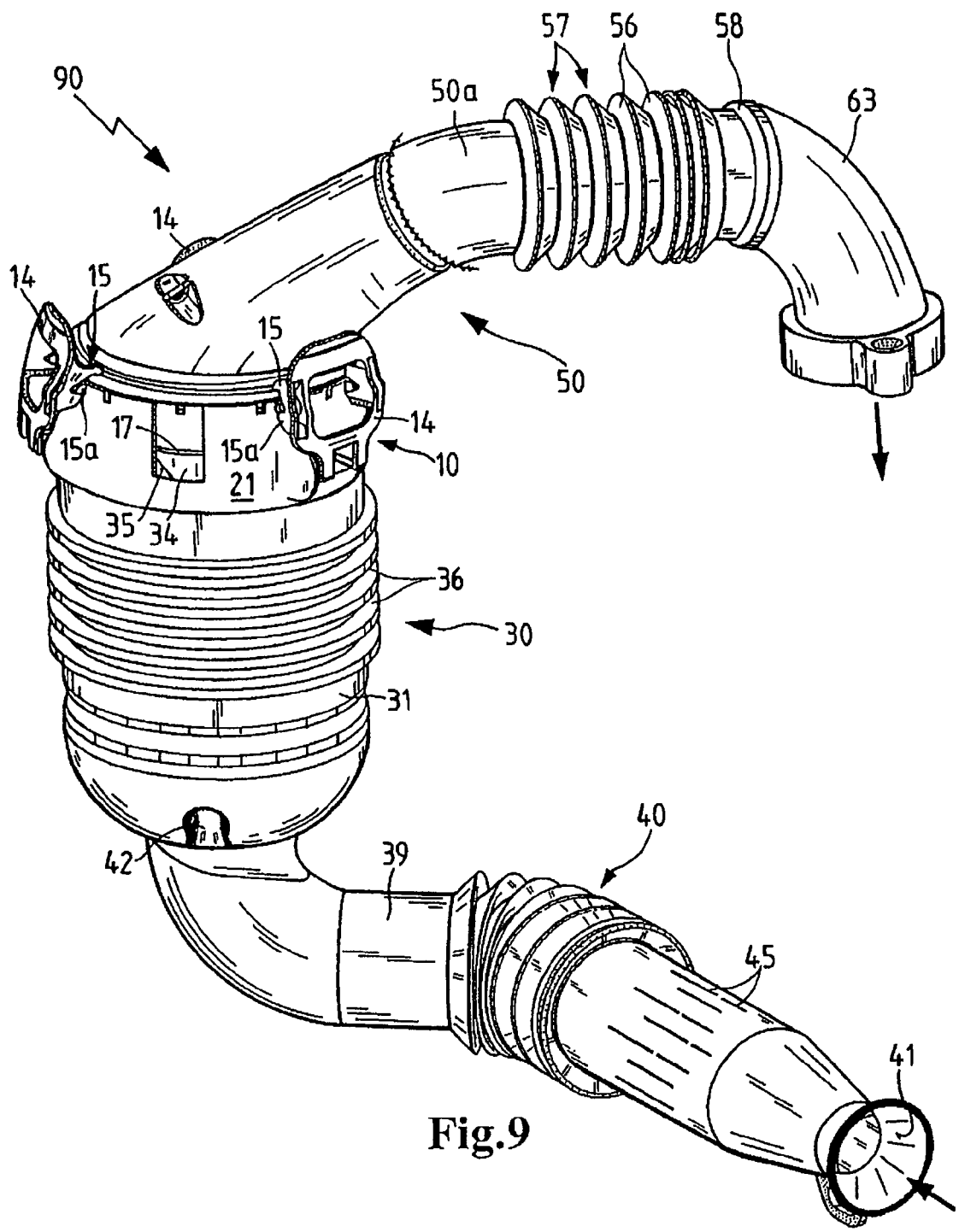
FIG. 9 is a perspective view of an assembled air filter system according to the invention.

FIG. 9 shows the assembled air filter system 90 according to FIG. 8, with a flexible section 57 shown on the clean air tube 50. The folds 56 are shown partially in a stretched state and partially in a compressed state on this section. The connecting collar 58 is connected to an air tube 63. The clean air tube 50 is attached to the filter element 10 by three pivotable catches 14 through their claws 15a, 15b. The unfiltered air element 30 is locked in the recesses 17 of the outer ring 21 by the detent noses 34. An angled unlocking surface 35 is visible on the fastening nose 34. In the area of the unlocking surface 35, the detent nose 34 is flattened. To release the locking connection, the unfiltered air element 30 or the filter element 10 is rotated around the filter axis so that the outer ring 21 is widened due to the angled unlocking surface and the connection between the outer ring 21 and the unfiltered air element 30 can be severed.

Ribs and grooves 36 are integrally molded on the filter housing 31, ensuring axial elasticity of the filter housing. A flexible tube section 40 is shown in a curved state on the unfiltered air tube 39. The flexible tube section 40 in this case corresponds to the flexible section 57 of the clean air tube 50, except that the folds 56 are shown in the compressed state only on one side of the circumference, thus yielding a bending angle. Furthermore, slots 45 are provided in the wall of the intake tube 39, serving to provide acoustic damping of the intake noise. The air stream is drawn in through the intake funnel 41.

Figure 10:
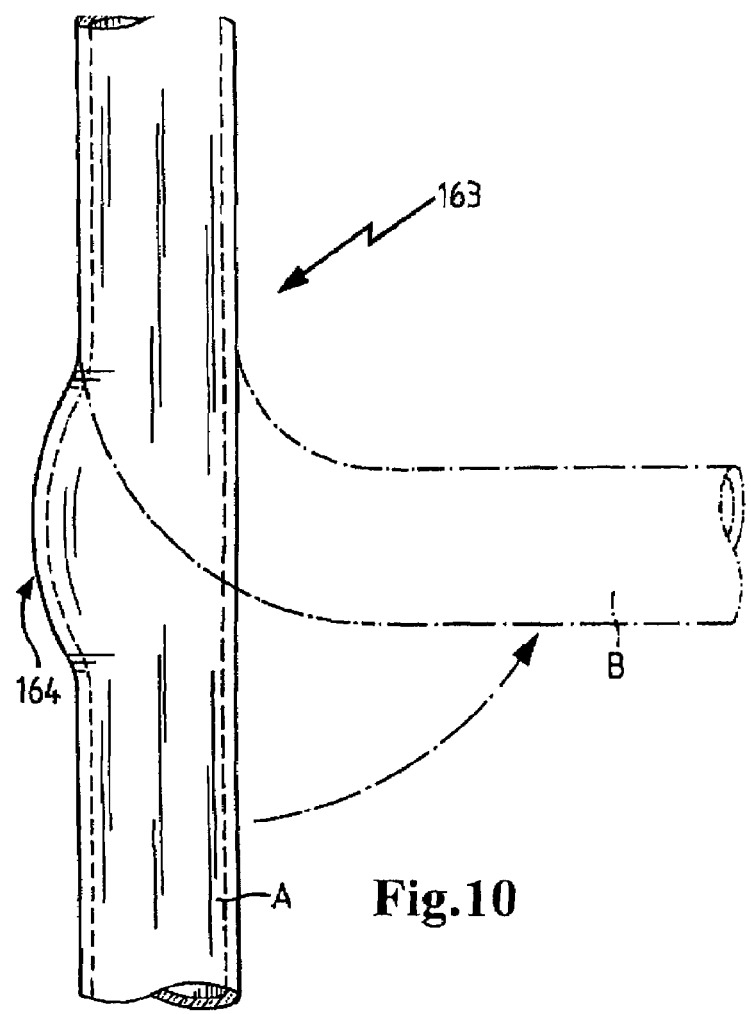
FIG. 10 shows a section from an air conduit tube.

FIG. 10 shows a detail of an air conduit tube 163 which is produced by the extrusion blow molding method and can be pivoted under the influence of a thermal treatment in subsequent treatment step. In the originally shaped state, the air conduit tube 163 assumes position A. The air conduit tube 163 has an outwardly curved bulge 164. To shape such plastic tubes, they are usually heated thermally so that they become plastically deformable. To prevent possible kinking or collapse of the tubes, they are filled with compressed air during the shaping operation. After the shaping operation, the air conduit tube assumes the shape shown in position B. The bulge 164 is shaped so that it takes into account the change in length of the outer fibers in the curved state and ensures a flow cross section having a uniform course.

Figure 11:
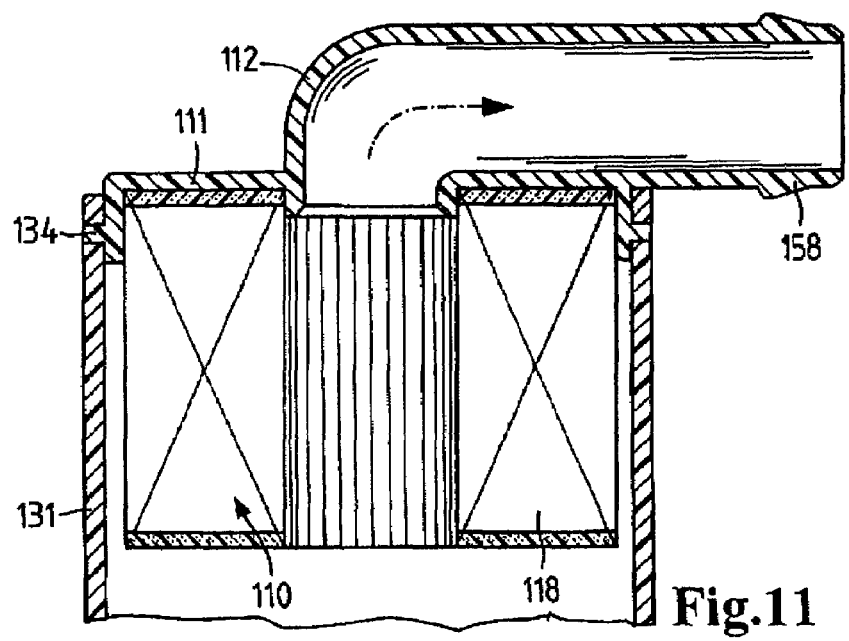
FIG. 11 is a view of an alternative jacket variant.

FIG. 11 shows a jacket 111 with a filter medium 118 and a filter housing 131. In this case, the filter medium 118 is a hollow filter element 110 which is pleated in zigzag pattern and is attached at one end to the jacket 111, e.g., by gluing or welding. The jacket 111 shown here is preferably produced by injection molding and includes an outlet tube 112 bent at a right angle to the axis of the housing. The jacket 111 is thus situated in the clean air area and continues the air flow to the connecting contour 158. The jacket 111 also has detent noses 134 that mate with recesses or apertures in the filter housing 131 and produce the attachment to the filter housing. As an alternative, the attachment between the jacket 111 and the filter housing 131 may also be established by grooves or bulges constructed so as to allow the filter housing 131 to be rotatable.

Figure 12:
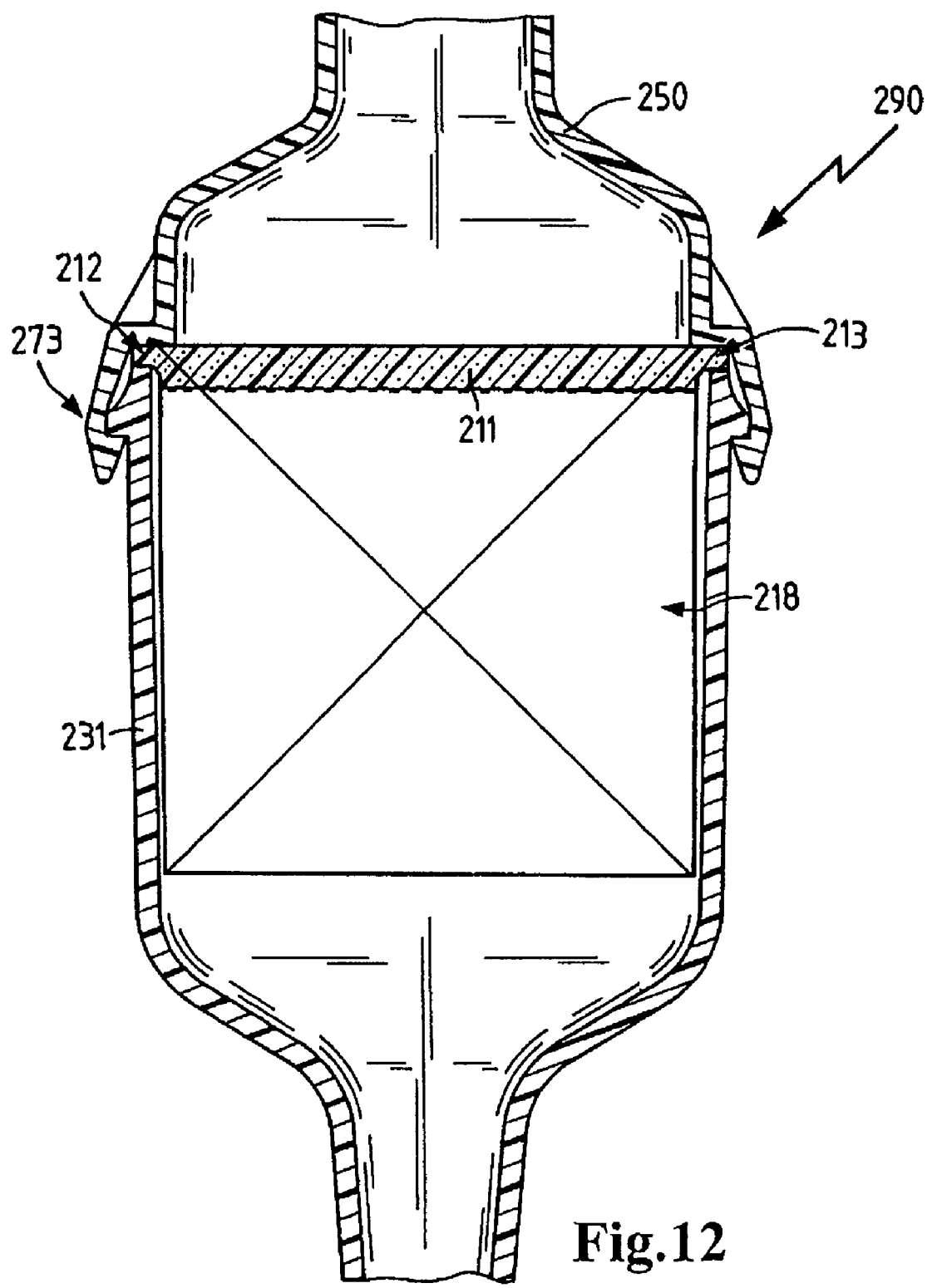
FIG. 12 is a detail view an air filter system comprising a filter element and an adapter element.

FIG. 12 shows an air filter system 290 in which a filter medium 218 is fixedly connected in a sealed manner to a jacket 211. The jacket 211 may in this case be made of an elastomer, e.g., a polyurethane (PU) foam or a sealingly bonded silicone or rubber ring that is sealingly connected to the filter medium 218. For this purpose the jacket 211 is constructed to be tight and to form a seal, so that a connection and a seal are established between a clean air tube 250 and a filter housing 231 of a sealing chamber 213. A sealing lip 212 of the jacket 211 is clamped in this case in the sealing chamber 213 between the clean air tube 250 and the filter housing 231, taking into account its elasticity. The connection is secured by a catch pair 273. As an alternative the attachment between the clean air tube 250 and the filter housing 231 may be established, for example, by a threaded connection or by spring clamps arranged on the exterior. In this case, there is no need for an elastic design of the sealing lip 212 and instead they may be formed by paper or felt, for example.

Figure 13:
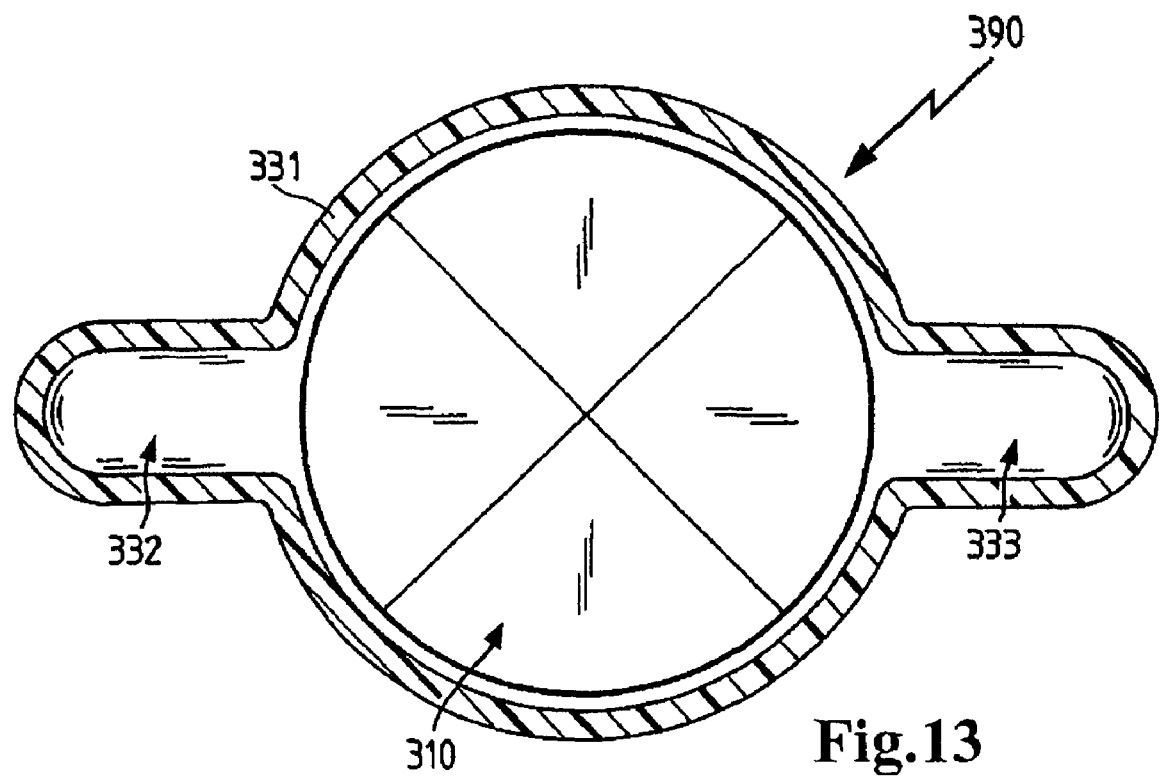
FIG. 13 is a sectional view through a cylindrical air filter element and an associated housing.

FIG. 13 shows a full sectional view of an air filter system 390. The sectional diagram here is shown across the filter axis of a filter element 310. A filter housing 331 forms a chamber for accommodating the filter element 310 and additionally has bulges or bays on two opposite flanks which form resonant chambers 332 and 333. These resonant chambers 332 and 333 serve to dampen acoustic pulsations and may be adapted in shape and volume size to the prevailing acoustic requirements. Of course, multiple resonant chambers may of course also be provided, forming different volume sizes.

Figure 14:
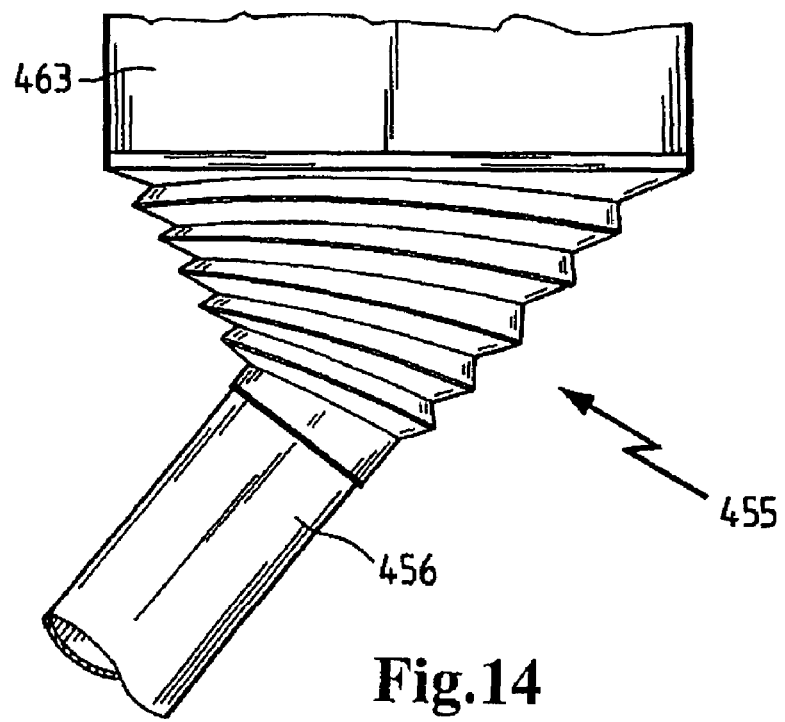
FIG. 14 is a section from a tube system having an integrated flexible pleated region.

FIG. 14 shows an air tube 463 which leads through a flexible reducing section 455 into a reduced tube 456. The shape of the folds in the flexible reducing section 455 allows a lockable bend in the reduced tube 456 and is comparable in the design of its fold geometry to the flexible tube section 40 of the previous figures. However, in contrast to previous designs, the flexible reducing section 455 has a funnel shape and enables realization of a very narrow curve design. This is advantageous in particular in very restricted installation situations.

Figure 15:
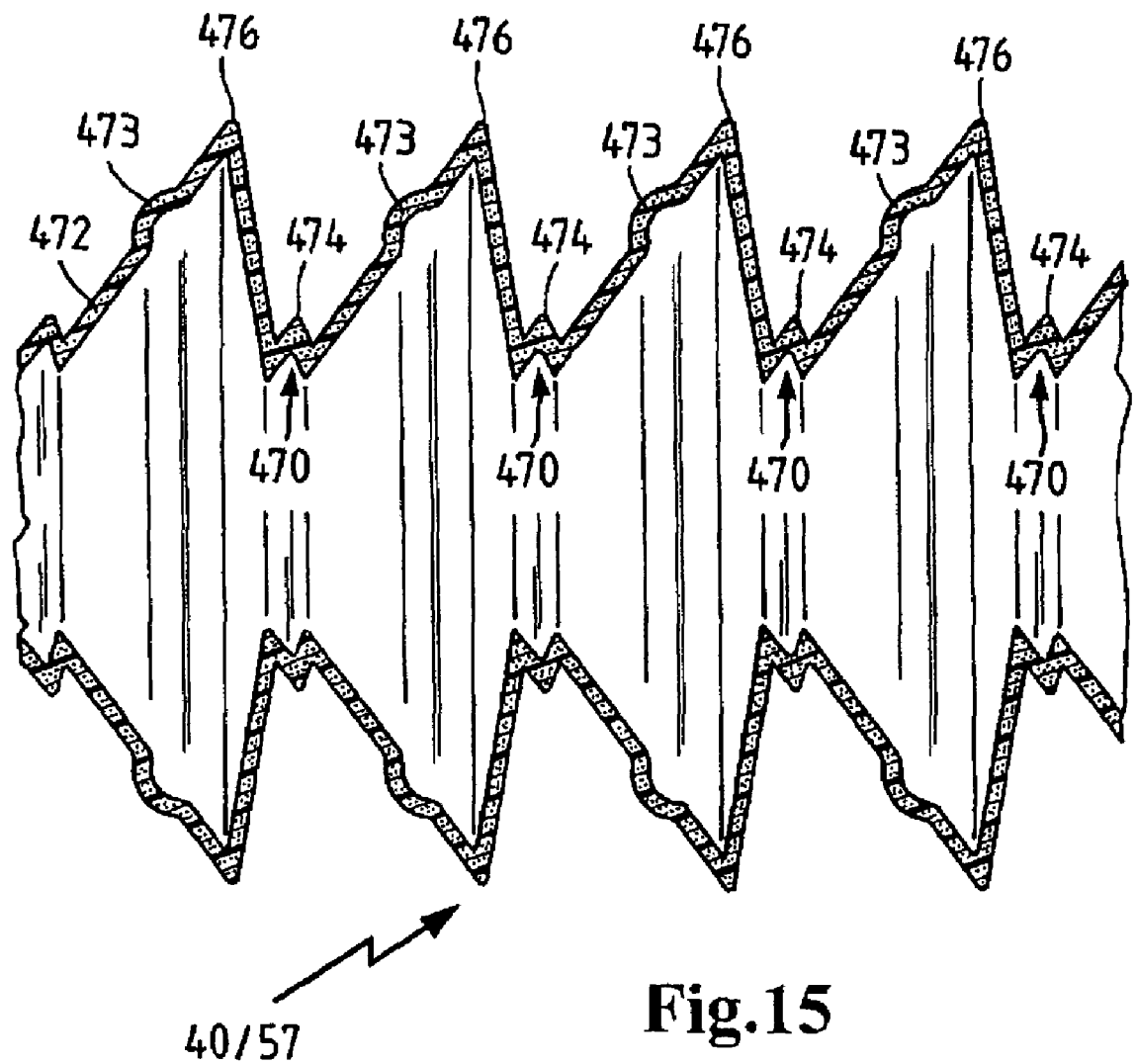
FIG. 15 is a sectional detail view of a flexible tube section variant.

FIG. 15 shows a fully sectional detail view of a flexible tube section. A fold geometry design of this type might be used, for example, in the flexible tube section 40 and/or 57 (FIG. 3, 4). Grooves 473 extending coaxially with the folds are arranged on the fold flanks 472 between the fold tips 476 and the inner fold tips 470. Additional folds 474 which also run parallel to the folds are arranged in the area of the inner fold tips 470. The expansion of material during the stretching and latching procedures takes place in the additional integral grooves 473 and/or additional folds. Therefore, materials that have a comparatively reduced elasticity may be used for the flexible and lockable air tubes. For example, a comparatively brittle material in the form of polypropylene T20 may be used in this case.

Figure 16:
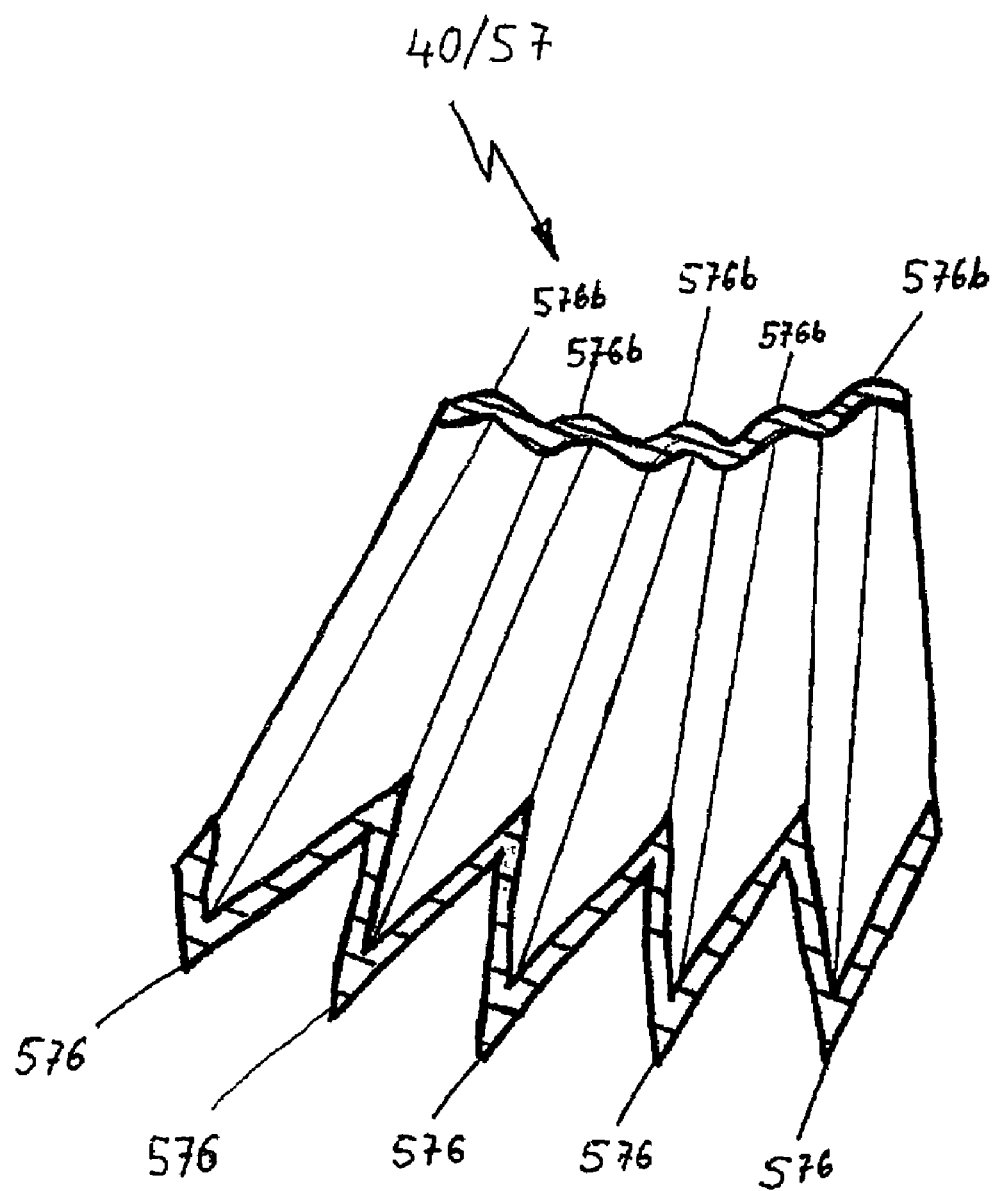
FIG. 16 is another sectional view of a tube section having an integrated pleated region.

The section 40/57 of a tube shown in a full sectional view is illustrated in FIG. 16 showing folds 576, 576b with different contours on the circumference. The peripheral fold sections 576 are designed with definite zigzags and correspond to the buckling folds shown in the previous figures. The pleating on the opposing corrugated folds 576 on the circumference is designed only with corrugations. On this end, the pleating may also be omitted completely. The buckling ability of the tube section may thus remain ensured due to the zigzag arrangement of folds on one end. This offers the advantage that the space required, the flow resistance and the sensitivity of the tube section to cold temperatures can be minimized.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter element comprising a filter medium extending over an axial length between a clean air end at one end and an unfiltered air end at the opposite end, a circumferential jacket surrounding the filter medium with the filter medium being attached in a sealed manner to the jacket, and the filter medium separating an unfiltered air end from the clean air end, wherein contours are provided on the jacket for fastening the filter element in a filter housing, wherein the jacket comprises an inner ring surrounded by a coaxial outer ring spaced a radial distance therefrom, with the inner and outer rings connected across the radial space between them by a circumferential web, and axially extending ribs are arranged between the outer ring and the inner ring.

2. A filter element according to claim 1, wherein the filter medium is a wound filter medium or an extruded filter medium.

3. A filter element according to claim 1, wherein the jacket comprises a fusion zone to which a circumferential edge at an end of the filter medium is fused such that the filter medium is attached in a sealed manner to the jacket.

4. A filter element comprising a filter medium extending over an axial length between a clean air end at one end and an unfiltered air end at the opposite end, a circumferential jacket surrounding the filter medium with the filter medium being attached in a sealed manner to the jacket, and the filter medium separating an unfiltered air end from the clean air end, wherein contours are provided on the jacket for fastening the filter element in a filter housing, wherein movable latches are arranged on the jacket for facilitating a form-fitting, detachable connection to a flange at the clean air end, wherein the movable latches comprise catches which are pivotably connected to the jacket by film hinges, and claws with facing flanks are arranged on the catches such that in a latched state the catches clamp a cam member on the jacket to a bulge on the flange at the clean air end, with the flanks of the claws urging the flange and jacket against each other under compression so that the film hinge is not subjected to stress, and wherein the movable latches are pivotable such that the catches can be oriented approximately perpendicular to the axis of the jacket and the claws are oriented approximately parallel to the axis of the jacket.

5. A filter element according to claim 4, wherein the filter medium is a wound filter medium or an extruded filter medium.

6. A filter element according to claim 4, wherein the jacket comprises a fusion zone to which a circumferential edge at an end of the filter medium is fused such that the filter medium is attached in a sealed manner to the jacket.

7. A filter element comprising a filter medium extending over an axial length between a clean air end at one end and an unfiltered air end at the opposite end, a circumferential jacket surrounding the filter medium with the filter medium being attached in a sealed manner to the jacket, and the filter medium separating an unfiltered air end from the clean air end, wherein contours are provided on the jacket for fastening the filter element in a filter housing, wherein the jacket has an elastic sealing contour at the clean air end, said sealing contour being produced in one piece with the jacket and forming a tight connection between the jacket and a flange at the clean air end, and the jacket has supporting contour which communicates with an annular contact surface of the flange at the clear air end, said supporting contour of the jacket comprising a radial supporting shoulder that communicates with an annular shoulder on the flange, and the flange is disposed at the clean air end of a clean air tube.

8. A filter element according to claim 7, wherein the filter medium is a wound filter medium or an extruded filter medium.

9. A filter element according to claim 7, wherein the jacket comprises a fusion zone to which a circumferential edge at an end of the filter medium is fused such that the filter medium is attached in a sealed manner to the jacket.

10. A filter element comprising a filter medium extending over an axial length between a clean air end at one end and an unfiltered air end at the opposite end, a circumferential jacket surrounding the filter medium with the filter medium being attached in a sealed manner to the jacket, and the filter medium separating an unfiltered air end from the clean air end, wherein contours are provided on the jacket for fastening the filter element in a filter housing, wherein the jacket of the filter element is provided with recesses which receive detent noses formed on a filter housing such that the detent noses on the filter housing latch in the recesses and thereby attach filter housing to the filter element.

11. A filter element according to claim 10, wherein the filter medium is a wound filter medium or an extruded filter medium.

12. A filter element according to claim 10, wherein the jacket comprises a fusion zone to which a circumferential edge at an end of the filter medium is fused such that the filter medium is attached in a sealed manner to the jacket.

* * * * *